US012783657B2

United States Patent
(12) United States Patent
Shahriar et al.

(10) Patent No.: US 12,783,657 B2
(45) Date of Patent: Nov. 3, 2026

(54) VECTOR VARIATION DRIVEN MALWARE CORRUPTION DETECTION

(71) Applicant: NetApp, Inc., San Jose, CA (US)

(72) Inventors: Muneem Shahriar, Sunnyvale, CA (US); Mesfin Dema, Allen, TX (US); Arunkumar Gururajan, Sammamish, WA (US); Phani Srikanth Bhavani Sankar, Telangana (IN); Jian Jian, Cupertino, CA (US); Yogita Verma, Karnataka (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/785,421

(22) Filed: Jul. 26, 2024

(65) Prior Publication Data

US 2025/0245324 A1 Jul. 31, 2025

Related U.S. Application Data

(60) Provisional application No. 63/625,825, filed on Jan. 26, 2024.

(30) Foreign Application Priority Data

Apr. 23, 2024 (IN) ............................. 202441032106

(51) Int. Cl.
*G06F 21/56* (2013.01)

(52) U.S. Cl.
CPC ........ *G06F 21/56* (2013.01); *G06F 2221/034* (2013.01)

(58) Field of Classification Search
CPC ........................... G06F 21/56; G06F 2221/034
See application file for complete search history.

(56) References Cited

U.S. PATENT DOCUMENTS

| | | | |
|---|---|---|---|
| 10,229,269 B1 * | 3/2019 | Patton .................. | G06F 21/554 |
| 12,081,569 B2 | 9/2024 | Shahul Hameed et al. | |
| 12,299,397 B2 * | 5/2025 | Turkkan ................. | G06F 40/30 |
| 12,524,529 B1 | 1/2026 | Siu et al. | |
| 2016/0057159 A1 | 2/2016 | Yin et al. | |

(Continued)

OTHER PUBLICATIONS

Nagano et al., "Static analysis with paragraph vector for malware detection." Proceedings of the 11th International Conference on Ubiquitous Information Management and Communication. Jan. 5, 2017. (Year: 2017).*

*Primary Examiner* — Zhe Liu

(57) ABSTRACT

Disclosed herein are methods, systems, and apparatus for the detection of data integrity anomalies indicative of malware for a datastore of an organization. To identify an anomaly in a file, a portion of a file is identified to be used in a vector comparison. The portion can comprise sentences or paragraphs for text files, entries, rows, or columns for spreadsheet files, or some other divisible portion of a file. A vector having multiple dimensions is generated for the portion based on the content in the portion. Each dimension of the multiple dimensions corresponds to a feature of the portion. A variation is determined between the vector and one other vector associated with one other portion of the file. One or more actions to take with respect to the file is determined based on the variation, such as malware mitigation, and the action is performed with respect to the file.

20 Claims, 9 Drawing Sheets

(56) References Cited

U.S. PATENT DOCUMENTS

| | | | | |
|---|---|---|---|---|
| 2016/0248805 | A1* | 8/2016 | Burns | H04L 63/1416 |
| 2017/0193230 | A1* | 7/2017 | Jevnisek | G06F 21/564 |
| 2020/0220885 | A1* | 7/2020 | Will | H04L 63/145 |
| 2020/0301953 | A1 | 9/2020 | Abhyankar et al. | |
| 2020/0364343 | A1 | 11/2020 | Atighetchi et al. | |
| 2021/0256115 | A1* | 8/2021 | Shashanka | G06F 40/30 |
| 2022/0261506 | A1* | 8/2022 | Steinberg | G06F 21/64 |
| 2023/0145463 | A1 | 5/2023 | Bayomi et al. | |
| 2024/0007495 | A1 | 1/2024 | Coull et al. | |
| 2024/0311582 | A1* | 9/2024 | Schaefer | G06F 11/3608 |
| 2024/0362328 | A1* | 10/2024 | Chung | G06F 21/554 |
| 2025/0200281 | A1 | 6/2025 | Mohanty et al. | |

* cited by examiner

500

VECTOR VARIATION DRIVEN MALWARE CORRUPTION DETECTION

TECHNICAL FIELD

Aspects of the disclosure are generally related to the field of computing hardware and software, and more specifically, malware corruption detection technology.

BACKGROUND

Organizations deploy cybersecurity measures such as regular software updates, network security protocols, and user training to prevent malware from becoming active in a computing network or a database. While these security measures provide a measure of protection for an organization's assets, when an attack does occur, difficulties arise in identifying the scope of the attack and the data modified as part of the attack.

Cybersecurity attacks can vary in method, sophistication, and scope, and may target a variety of network or database locations. Additionally, where some attacks modify all of the data in a targeted location, other attacks modify only some fraction of the data in the targeted location. An attack that partially modifies a target file's data can cause similarly disruptive effects as an attack that modifies all of the target file's data but can be additionally difficult to evaluate because of the relatively small effect partial modification may have on a file. As such, cybersecurity attacks, and particularly cybersecurity attacks employing partial modification of targeted data, remain a challenge for cybersecurity measures. Accordingly, improvements are needed in the field of cybersecurity and particularly in the field of cybersecurity attack detection.

SUMMARY

Described herein are methods, systems, and apparatus for the detection of data integrity anomalies associated with malware for a datastore of an organization. To support data integrity and identify the effect of different attacks on files of the datastore, the data storage computing system includes software for executing a malware corruption detection process that directs the computing system to identify variations in the content of a particular file. A variation in the content of a file refers to a discrepancy between one portion of the file and the other portions of the file. For example, a malware threat could change the content of a paragraph in a document such that the modified content is unrelated to the text document as whole. An unrelated paragraph in a document constitutes a data integrity anomaly indicative of the presence of malware.

To identify deviant content in a file, the computing system is instructed to identify a portion of a file to be used in a vector comparison. The portion can comprise one or more sentences or one or more paragraphs in the case of a text file, can comprise one or more entries, one or more rows, or one or more columns in a spreadsheet file, or can comprise some other divisible portion of a file.

The computing system is instructed to generate a vector having multiple dimensions for the portion based on the content in the portion. Each dimension of the multiple dimensions corresponds to a feature of the portion of the file. After the vector is generated, the computing system is instructed to determine a variation between the vector and one otter vector associated with one other portion of the file.

The computing system is then instructed to determine, based on the variation, an action to take with respect to the file, and to perform the action.

This Summary introduces a selection of concepts in a simplified form that are further described below in the Technical Disclosure. It may be understood that this Summary is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Figure 1:
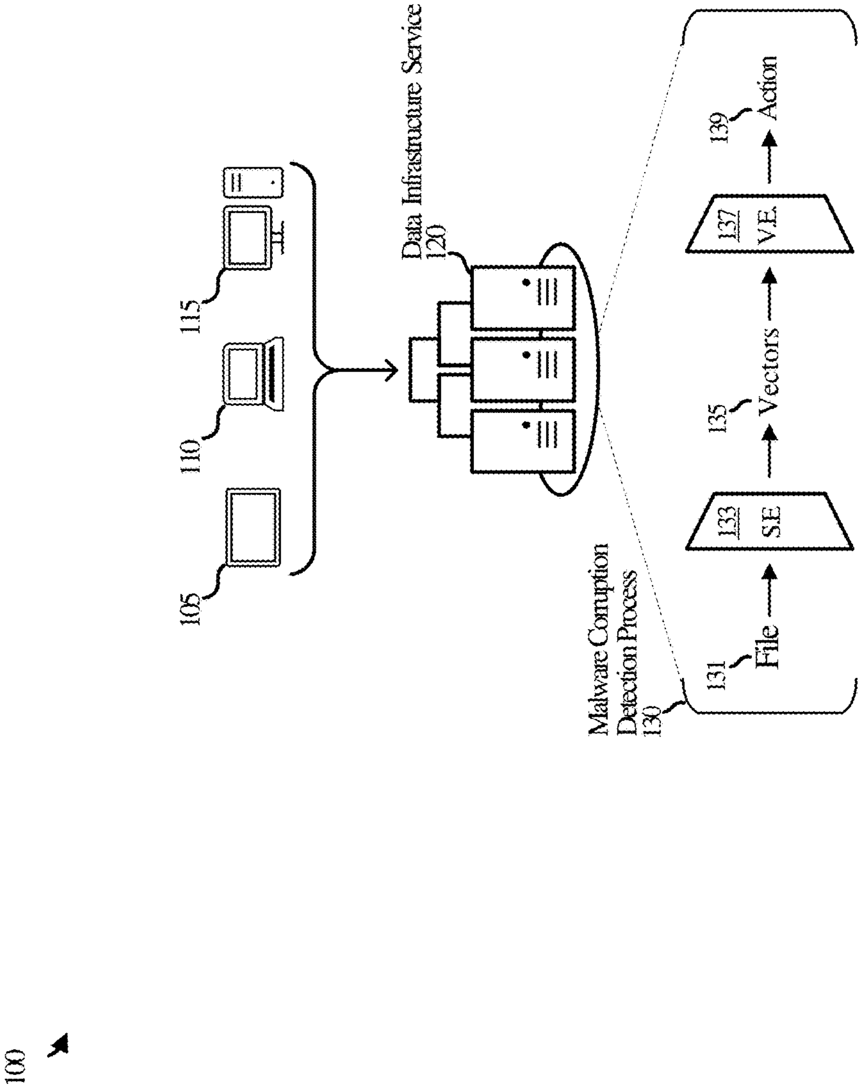
FIG. 1 illustrates a computing environment in an implementation.

Described herein are methods, systems, and apparatus for the detection of data integrity anomalies associated with malware for a datastore of an organization. In an organization, a data storage computing system is deployed that provides data storage service, integrated data service, and cloud operations service in association with a datastore. The data storage computing system is local or private to the organization and enables these services through features that support various storage protocols, data tiering, deduplication, encryption, high availability, amongst other potential features.

Here, to support data integrity and identify the effect of different attacks on files of the datastore, the data storage computing system includes software for identifying variations in the content of a particular file. For example, a threat could change the content of paragraphs in a document, such that the new content is unrelated to the text document as whole.

To identify deviant content in a file, the computing system is instructed to identify a portion of a file to be used in a vector comparison. The portion can comprise sentences or paragraphs in the case of a text file, can comprise entries, rows, or columns in a spreadsheet file, or can comprise some other divisible portion of a file.

The computing system is instructed to generate a vector having multiple dimensions for the portion based on the content in the portion. Vectors play a crucial role as the fundamental building blocks for representing data. Each data point is often represented as a vector in a high-dimensional space, where each dimension corresponds to a feature or attribute of the data. For example, for a text file, a vector is generated for a paragraph that represents word choice information, subject matter information, data points (e.g., numerical values), or other information about the paragraph.

After the vector is generated, the computing system is instructed to determine a variation between the vector and one otter vector associated with one other portion of the file. To determine a variation, the computing system is instructed to compare vectors associated with different portions of the file to determine whether the vector comparison exceeds a threshold amount. If the vector for a first paragraph in a set of five paragraphs exceed a threshold amount, then the computing system will classify the first paragraph as an anomaly in the text file. Once the anomaly, which is indicative of a malware attack, is identified, the computing system is instructed to determine an action with respect to the file and to perform the action. The action is used to notify an administrator or user of the anomaly, to move the file to a quarantine zone, to prevent the file from being stored in the datastore, to revert the file to a previous version, or to provide some other action with respect to the file.

In some embodiments, the action the computing system is instructed to determine, and initiate, comprises a malware mitigation process. In such an embodiment, performing the action comprises performing malware mitigation, which comprises checking the file having the anomaly for evidence of a malware event. In some embodiments, the action comprises editing assistance. In such an embodiment, performing the action comprises performing editing assistance, which comprises checking the file having the anomaly for editing errors.

In some embodiments, the portion of the file comprises a text string. In such embodiments, the multiple dimensions comprise one or more features of the text string. Here, generating the vector comprises obtaining a feature value for each of the one or more characteristics of the text string and using the feature values as data points for the vector. Any subset of the text string may be used to create the feature vector. The feature vector could be created at a character level, a word level, a phrase level, a sentence level, an entire document paragraph, or a combination thereof. In some other embodiments, the portion of the file comprises a text string having features that include one or more semantic features, one or more linguistic features, or a combination thereof. In such embodiments, a semantic feature engine is queried with the portion and returns one or more semantic features. Similarly, a linguistic feature engine is queried with the portion and returns one or more linguistic features.

In some embodiments, a magnitude of the variation is calculated. The variation between vectors refers to the magnitude of the change in meaning of the text versus the modified text. The magnitude of variation between vectors is determined via vector comparison analysis. In such embodiments, determining the action based on the variation comprises determining the action based on the magnitude of the variation. In some examples, determining the action based on the magnitude of the variation comprises selecting an action from a set of potential actions based on the magnitude of the variation. Examples of such potential actions include no responsive action, malware mitigation, editing assistance, action for a variation below minimum limit, and action for a variation above maximum limit.

Various embodiments of the present technology provide for a wide range of technical effects, advantages, and/or improvements to computing systems and components. For example, various embodiments may include one or more of the following technical effects, advantages, and/or improvements: 1) non-routine and unconventional detection of data integrity anomalies in different types of files; and 2) non-routine and unconventional use of calculated vectors from content of a file to determine whether anomalies exist in a file.

FIG. 1 illustrates computing environment 100 in an implementation. Computing environment 100 includes user device 105, user device 110, and data infrastructure service 120. Data infrastructure service 120 includes malware corruption detection process 130, which further includes file 131, security engine 133, vectors 135, variation engine 137, and action 139. Malware corruption detection process 130 is generally representative of the malware corruption detection method disclosed herein, the steps of which may not necessarily be performed in the given order. Additional steps may exist in the malware corruption detection method disclosed herein but have been omitted from malware corruption detection process 130 for clarity.

Computing environment 100 is generally representative of a computing environment in which a data infrastructure service, such as data infrastructure service 120, operates. In an example, computing environment 100 is an enterprise environment.

Each of user device 105, user device 110, and user device 115 are generally representative of a user device sufficient to communicate with data infrastructure service 120. User device 105 is illustrated as a tablet computer, user device 110 is illustrated as a laptop computer, and user device 115 is illustrated as a desktop computer. Note that any number of user devices may communicate with data infrastructure service 120 and may be comprised of any number of a variety of computing devices, of which user device 105, user device 110, and user device 115 are generally representative.

Data infrastructure service 120 is representative of a computing device that enables these services through features that support various storage protocols, data tiering, deduplication, encryption, high availability, amongst other potential features. In computing environment 100, an organization uses data infrastructure service 120 to provide data storage service, integrated data service, and cloud operations service. One example of integrated data service is malware corruption detection process 130.

Malware corruption detection process 130 is illustrated at a high level by constituent elements file 131, security engine 133, vectors 135, variation engine 137, and action 139. Each of file 131, security engine 133, vectors 135, variation engine 137, and action 139 correspond to a step in malware corruption detection process 130. File 131 corresponds to the identification of a file to be used in a vector comparison. Security engine 133 corresponds to the generation of a vector for a portion of the identified file. Vectors 135 corresponds to the vector for the portion of the file and one other vector used as the basis for the vector comparison. Variation engine 137 corresponds to the determination of a variation between the vector and the one other vector. Based on the determined variation, variation engine 137 determines an action to take with respect to the file. Action 139 corresponds to the performing of the action with respect to the file.

Figure 2:
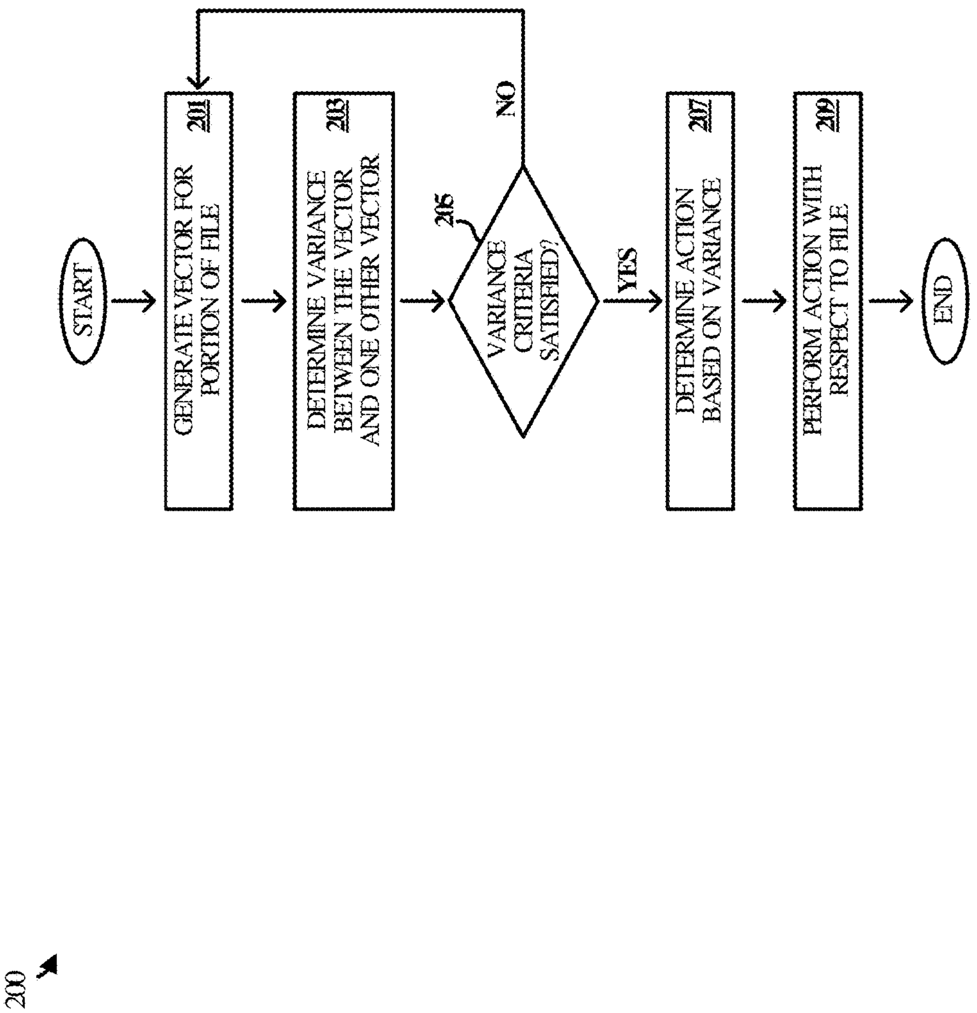
FIG. 2 illustrates a malware corruption detection process in an implementation.

FIG. 2 illustrates malware corruption detection process 200 in an implementation. Malware corruption detection process 200 may be implemented in program instructions in the context of the software and/or firmware elements of data infrastructure service 120. The program instructions, when executed by one or more processing devices of one or more computing systems (e.g., computing device 605 in FIG. 6), direct the one or more computing systems to operate as follows, referring parenthetically to the steps in FIG. 2, and in the singular to a computing device for the sake of clarity.

To begin, a security engine of a data infrastructure service generates a vector having multiple dimensions for a portion of a file to be used in a vector comparison (step 201). In some embodiments, the security engine is tasked with identifying modifications to a file, on which the vector is calculated. Each dimension of the multiple dimensions of the vector corresponds to a feature of the portion of the file. A variation engine of the data infrastructure service determines a variation between the vector and one other vector based on one other portion of the file (step 203). The variation engine determines if the vector comparison exceeds a threshold criteria by performing a comparison of the vector and one other vector (step 205). Where the variation between the vector and one other vector does not exceed a threshold criteria, the security engine of the data infrastructure service repeats the malware corruption detection process. Where the variation between the vector and one other vector does exceed a threshold criteria, the security engine determines an action to take with respect to the file based on the variation (step 207). Notably, particular actions can be taken specifically when the variation is below a minimum limit and when the variation is above a maximum limit. The variation engine performs the action with respect to the file (step 209).

Figure 3A:
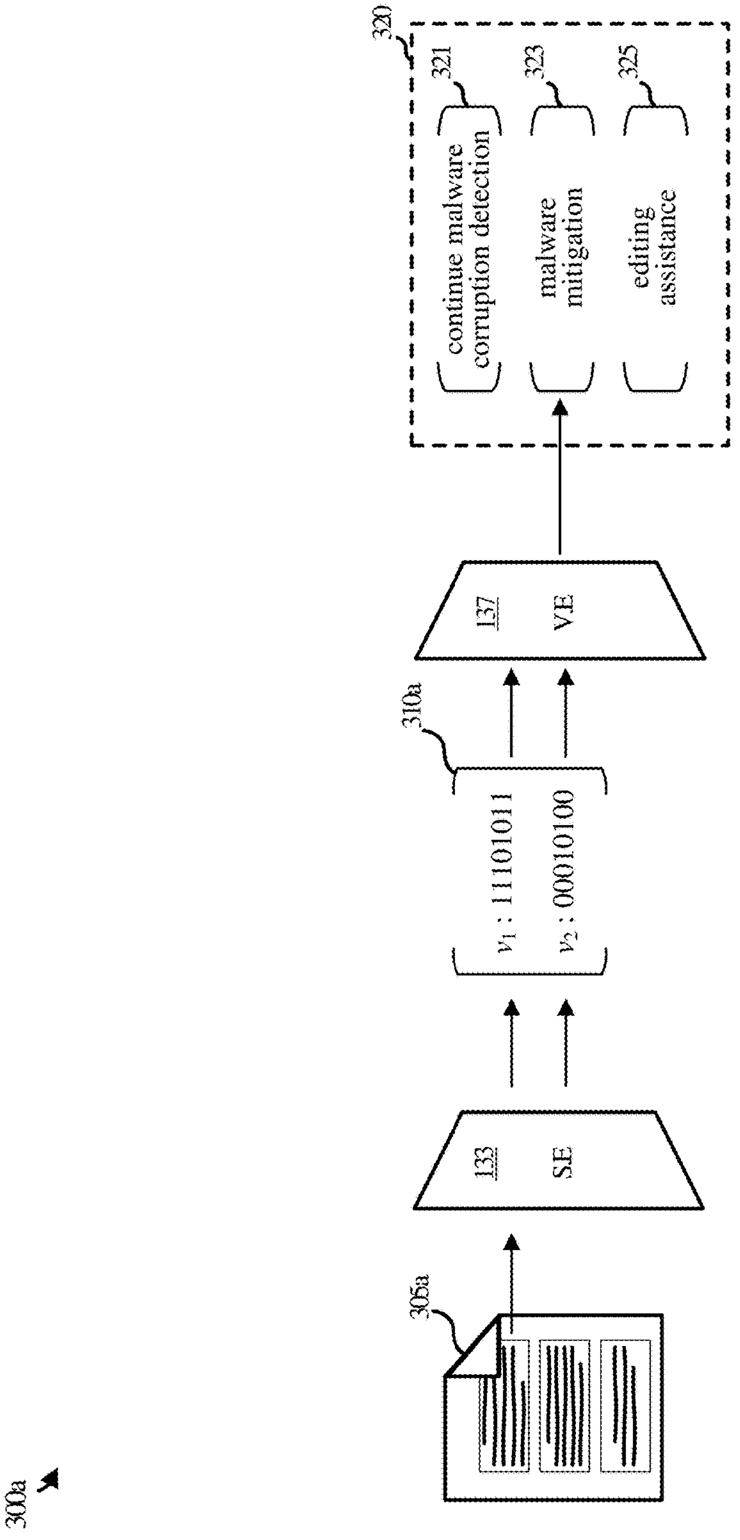
FIG. 3A illustrates an operational scenario in an implementation.

FIG. 3A illustrates operational scenario 300*a* in an implementation related to an application of malware corruption detection process 200 in the context of computing environment 100 in an implementation. Operational scenario 300*a* includes file 305*a*, security engine 133, vectors 310*a*, variation engine 137, and set of potential actions 320. Set of potential actions 320 includes continue malware corruption detection 321, malware mitigation 323, and editing assistance 325. File 305*a*, vectors 310*a*, and set of potential actions 310 generally correspond to file 131, vectors 135, and action 139 of FIG. 1, respectively. Security engine 133 and variation engine 137 are the same elements as security engine 133 and variation engine 137 of FIG. 1.

File 305*a* is representative of a file identified to be used in a vector comparison. File 305*a* is illustrated to include a number of individual paragraphs. In operational scenario 300*a*, file 305*a* is divisible into the individual paragraphs, which are used as the basis for selecting a portion. The portion of file 305*a* is fed to security engine 133, which generates a vector for the portion. Security engine 133 generates a vector for the portion by submitting the portion to a number of feature engines, each of which is associated with a different feature of the portion. In response to receiving the portion, each of the feature engines determines a value for the portion. Each feature of the portion represents a dimension in vector space and each value received from each of the number of feature engines is a data point constituent of the vector. The vector generated for the portion of the file is represented by vectors 310*a*. Vectors 310*a* represents both the vector for the portion of the file and one other vector for one other portion of the file. Both the vector and the one other vector are submitted to variation engine 137 to determine a variation. The variation determined by variation engine 137 is the basis for selecting an action from set of potential actions 320.

In an example operation, file 305*a* is a text file containing an anomaly. Security engine 133 identifies a portion of file 305*a* and generates a vector for the portion, represented by vi of vectors 310*a*. The one other vector is represented by $v_2$ of vectors 310*a*. Variation engine 137 evaluates the vectors to determine a variation. In the ongoing example, variation engine 137 determines that the variation is high and above a maximum predetermined limit. In this example, the high variation is the result of a malicious modification, such as an encryption process or content revision by a malware attack. Based on the outcome of the variation determination, variation engine 137 determines an action to take from list of potential actions 320. The variation here was determined to be above a maximum limit, resulting in the determination that the action to take should be malware mitigation 323. Variation engine 137 then performs malware mitigation 323.

Figure 3B:
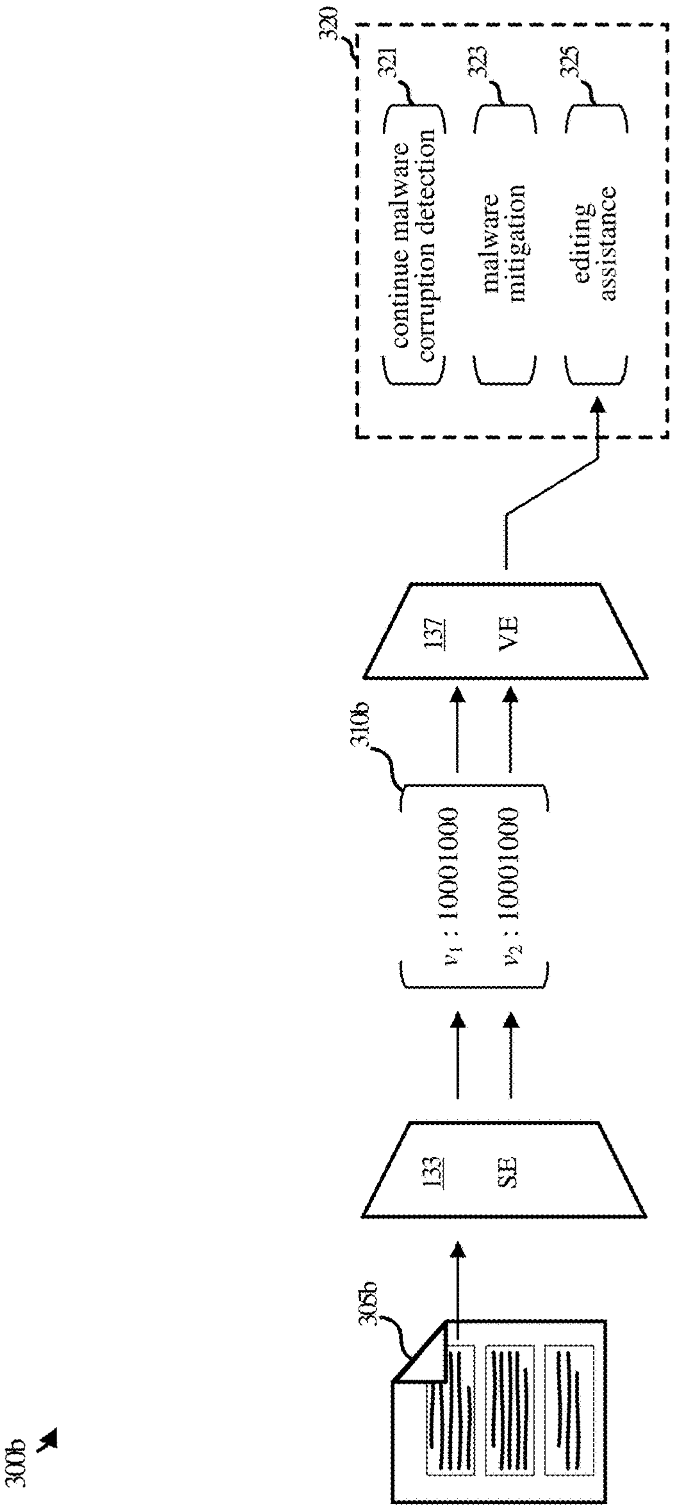
FIG. 3B illustrates another operational scenario in an implementation.

FIG. 3B illustrates another operational scenario, represented by operational scenario 300*b*, in an implementation related to an application of malware corruption detection process 200 in the context of computing environment 100 in an implementation. Operational scenario 300*b* includes file 305*b*, security engine 133, vectors 310*b*, variation engine 137, and set of potential actions 320. Set of potential actions 320 includes continue malware corruption detection 321, malware mitigation 323, and editing assistance 325. File 305*b*, vectors 310*b*, and set of potential actions 310 generally correspond to file 131, vectors 135, and action 139 of FIG. 1, respectively. Security engine 133 and variation engine 137 are the same elements as security engine 133 and variation engine 137 of FIG. 1.

File 305*b* is representative of a file identified to be used in a vector comparison. File 305*b* is illustrated to include a number of individual paragraphs. In operational scenario 300*b*, file 305*b* is divisible into the individual paragraphs, which are used as the basis for selecting a portion. The portion of file 305*b* is fed to security engine 133, which generates a vector for the portion. Security engine 133 generates a vector for the portion by submitting the portion to a number of feature engines, each of which is associated with a different feature of the portion. In response to receiving the portion, each of the feature engines determines a value for the portion. Each feature of the portion represents a dimension in vector space and each value received from each of the number of feature engines is a data point constituent of the vector. The vector generated for the portion of the file is represented by vectors 310*b*. Vectors 310*b* represents both the vector for the portion of the file and one other vector for one other portion of the file. Both the vector and the one other vector are submitted to variation engine 137 to determine a variation. The variation determined by variation engine 137 is the basis for selecting an action from set of potential actions 320.

In an example operation, file 305*b* is a text file containing an anomaly. Security engine 133 identifies a portion of file 305*b* and generates a vector for the portion, represented by vi of vectors 310*b*. The one other vector is represented by $v_2$ of vectors 310*b*. Variation engine 137 evaluates the vectors to determine a variation. In the ongoing example, variation engine 137 determines that the variation is low and below a minimum predetermined limit. In this example, the low variation is the result of an editing anomaly, such as a mistaken copy and paste duplication of an existing paragraph in the document. Based on the outcome of the variation determination, variation engine 137 determines an action to take from list of potential actions 320. The variation here was determined to be below a minimum limit, resulting in the determination that the action to take should be editing assistance 325. Variation engine 137 then performs editing assistance 325.

Figure 3C:
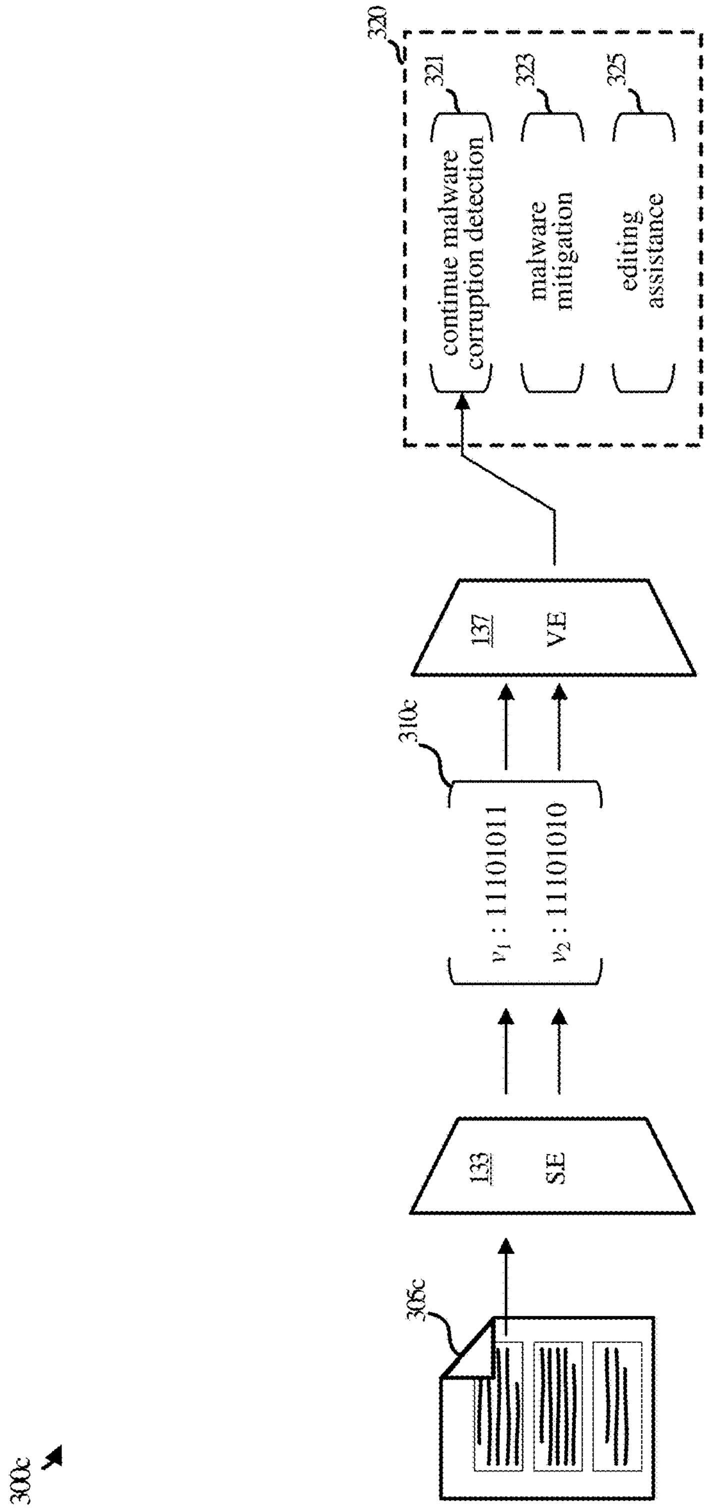
FIG. 3C illustrates another operational scenario in an implementation.

FIG. 3C illustrates another operational scenario, represented by operational scenario 300*c*, in an implementation related to an application of malware corruption detection process 200 in the context of computing environment 100 in an implementation. Operational scenario 300*c* includes file 305*c*, security engine 133, vectors 310*c*, variation engine 137, and set of potential actions 320. Set of potential actions 320 includes continue malware corruption detection 321, malware mitigation 323, and editing assistance 325. File 305*c*, vectors 310*c*, and set of potential actions 310 generally correspond to file 131, vectors 135, and action 139 of FIG. 1, respectively. Security engine 133 and variation engine 137 are the same elements as security engine 133 and variation engine 137 of FIG. 1.

File 305*c* is representative of a file identified to be used in a vector comparison. File 305*c* is illustrated to include a number of individual paragraphs. In operational scenario 300*c*, file 305*c* is divisible into the individual paragraphs, which are used as the basis for selecting a portion. The portion of file 305*c* is fed to security engine 133, which generates a vector for the portion. Security engine 133 generates a vector for the portion by submitting the portion to a number of feature engines, each of which is associated with a different feature of the portion. In response to receiving the portion, each of the feature engines determines a value for the portion. Each feature of the portion represents a dimension in vector space and each value received from each of the number of feature engines is a data point constituent of the vector. The vector generated for the portion of the file is represented by vectors 310*c*. Vectors 310*c* represents both the vector for the portion of the file and one other vector for one other portion of the file. Both the vector and the one other vector are submitted to variation engine 137 to determine a variation. The variation determined by variation engine 137 is the basis for selecting an action from set of potential actions 320.

In an example operation, file 305*c* is a text file that does not contain an anomaly. Security engine 133 identifies a portion of file 305*c* and generates a vector for the portion, represented by $v_1$ of vectors 310*c*. The one other vector is represented by $v_2$ of vectors 310*c*. Variation engine 137 evaluates the vectors to determine a variation. In the ongoing example, variation engine 137 determines that the variation is above a minimum predetermined limit and below a maximum predetermined limit. In other words, the variation determination is not indicative of anomalies. Based on the outcome of the variation determination, variation engine 137 determines an action to take from list of potential actions 320. The variation here was determined to be within an acceptable predetermined range defined by the maximum limit and minimum limit, resulting in the determination that the action to take should be continue malware corruption detection 321. Variation engine 137 then performs continue malware corruption detection 321. In some examples, measured variations can be grouped by association to a user identification in order to identify potentially malicious users or particular user credentials being used by malware attackers.

In some embodiments, the action to be taken is based on the magnitude of the variation identified in the comparison of vectors 310*c*. For example, where the magnitude of the variation falls in one particular range, specific actions such as execute a snapshot and run a malware scanner can be carried out. Similarly, where the magnitude of the variation falls in another particular range, specific actions such as alerting an administrator can be carried out. In some variation ranges, multiple actions may be carried out.

Figure 4A:
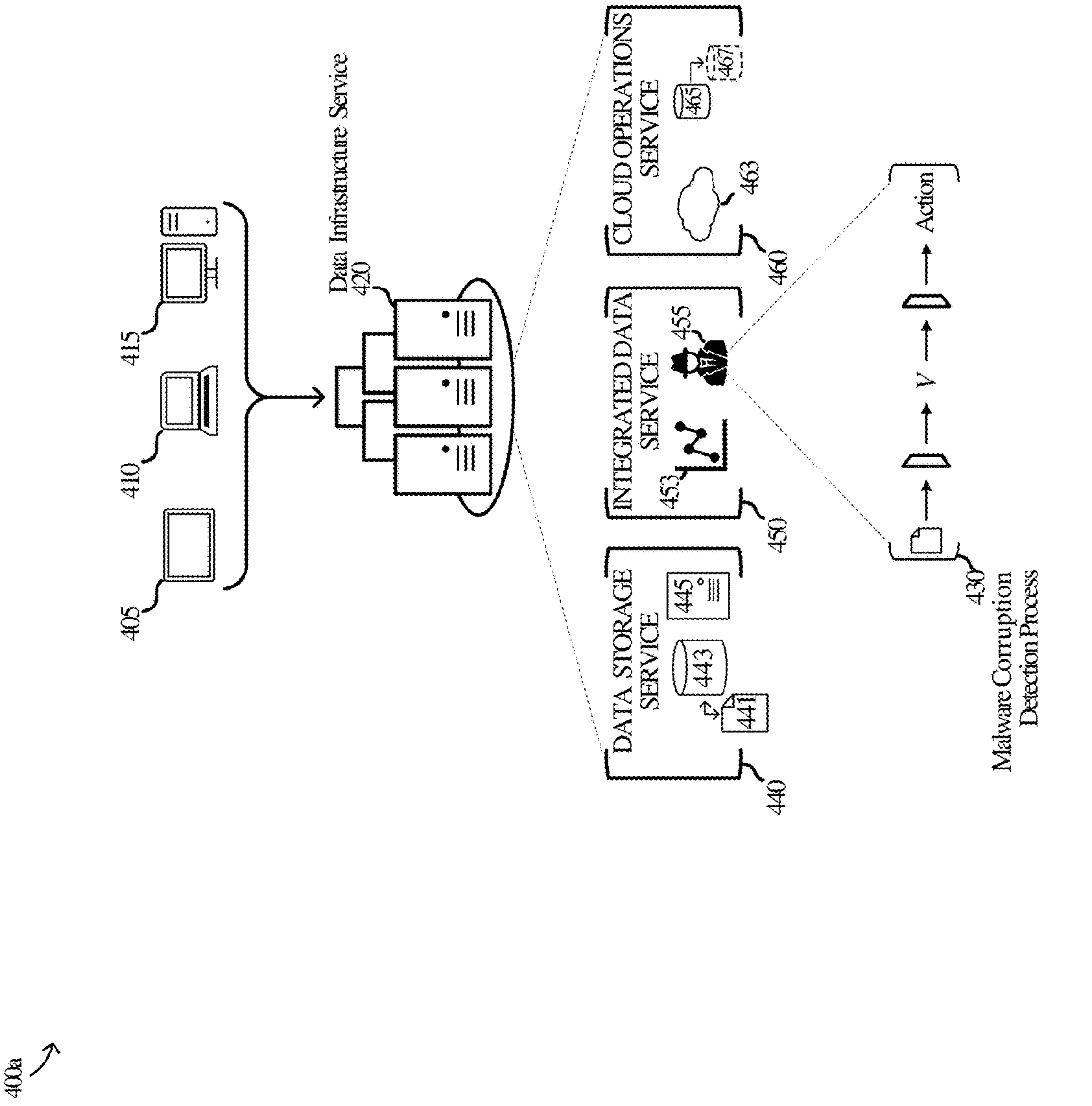
FIG. 4A illustrates another computing environment in an implementation.

FIG. 4A illustrates another computing environment in an implementation, represented by computing environment 400*a*. Computing environment 400 includes user device 405, user device 410, and data infrastructure service 420. Data infrastructure service 420 includes data storage service 440, integrated data service 450, and cloud operations service 460.

Computing environment 400*a* is generally representative of a computing environment in which a data infrastructure service, such as data infrastructure service 420, operates. In an example, computing environment 400*a* is an enterprise environment.

Each of user device 405, user device 410, and user device 415 are generally representative of a user device sufficient to communicate with data infrastructure service 420. User device 405 is illustrated as a tablet computer, user device 410 is illustrated as a laptop computer, and user device 415 is illustrated as a desktop computer. Note that any number of user devices may communicate with data infrastructure service 420 and may be comprised of any number of a variety of computing devices, of which user device 405, user device 410, and user device 415 are each generally representative.

Data infrastructure service 420 is representative of a computing device that enables services through features that support various storage protocols, data tiering, deduplication, encryption, high availability, amongst other potential features. In computing environment 400*a*, an organization uses data infrastructure service 420 to provide data storage service 440, integrated data service 450, and cloud operations service 460.

Data storage service 440 is generally representative of a data storage component of data infrastructure service 420. Data storage service 440 includes storage 443 and server 445, each of which are generally representative of media for storing data. Storage 443 stores file 441. With respect to malware corruption detection process 435, a file to be used in a vector comparison may be identified from the files stored in any number of locations within data storage service 440, an example of which is generally represented by file 441.

Integrated data service 450 is generally representative of an integrated data service component of data infrastructure service 420. Integrated data service 450 includes data analytics and insights 453 and malware assessment 455. Other examples of integrated data service 450 include data backup and recovery, data replication, data deduplication, data compression, data tiering, and the like. Malware assessment 455 is generally representative of a process for detecting malware that comprises malware corruption detection process 435 as well as a round robin file system scanning to detect malware. Malware corruption detection process 435 is generally representative of the steps of a process for detecting malware via vector comparison, though malware assessment 455 may contain other cybersecurity and cyberresilience processes and tools.

Cloud operations service 460 is generally representative of a cloud operations component of data infrastructure service 420. Cloud operations service 460 includes cloud storage 463 and a backup process illustrated by data 465 and back up 467. With respect to malware corruption detection process 430, a file for use in a vector comparison may be identified from the files stored in cloud storage 463.

In an example operation, user device 405, user device 410, and user device 415 communicate with data infrastructure service 420. Where malware assessment 455 is enabled, data infrastructure service 420 executes malware corruption detection process 430 and a malware scanning process. Other example operations of malware assessment 455 may include different cyberresilience and cybersecurity tools and processes. A user enables malware assessment 455, causing data infrastructure service 420 to begin malware corruption detection process 430 by identifying a portion of a file to be used in a vector comparison. Data infrastructure service 420 generates a vector for the portion and compares the vector to one other vector corresponding to one other portion of the file. By comparing the vector and the one other vector, data infrastructure service 420 determines a variation for the vector. Data infrastructure service 420 then determines an action to perform with respect to the file based on the variation and performs the action with respect to the file.

Figure 4B:
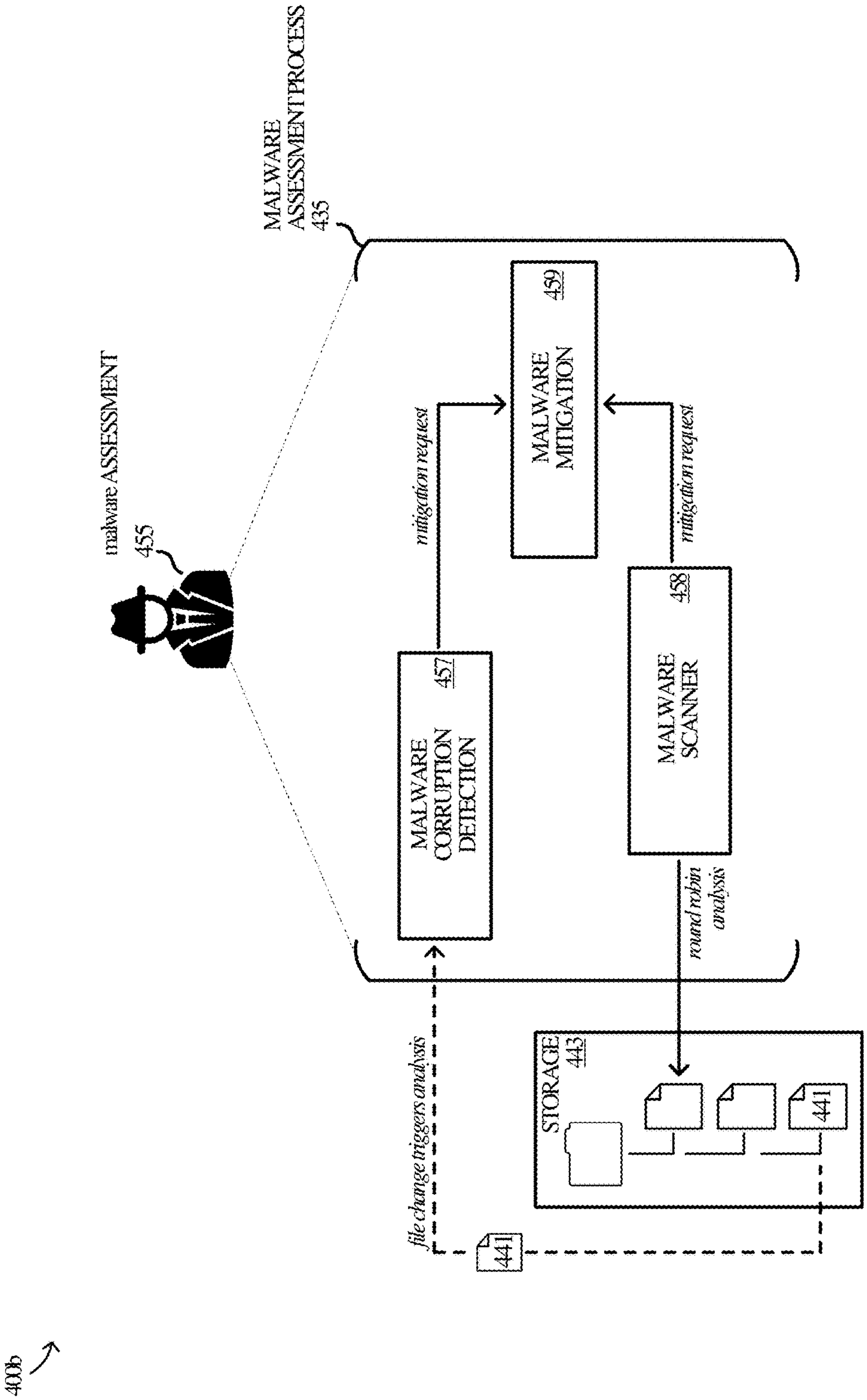
FIG. 4B illustrates another computing environment in an implementation.

FIG. 4B illustrates computing environment 400*a* in further detail, represented by computing environment 400*b*. Computing environment 400*b* includes malware assessment 455 and storage 443, which stores file 441. Malware assessment 455 is the same element as malware assessment 455 of FIG. 4A. Malware assessment 455 of FIG. 4B further includes malware assessment process 435.

Malware assessment process 435 includes malware corruption detection 457, malware scanner 458, and malware mitigation 459. Malware assessment process 435 is generally representative of a process for detecting the presence of malware in files with a malware corruption detection process and a malware scanning process, as performed by malware corruption detection 457 and malware scanner 458, respectively. An example of a malware corruption detection process is illustrated by malware corruption detection process 430 of FIG. 4A.

File 441 is the same as file 441 of FIG. 4A. File 441 may be stored via a data storage service of a data infrastructure service, such as data storage service 440 of data infrastructure service 420 illustrated in FIG. 4A. Integrated data service 450 may be carried out with respect to the files stored in storage 443, or with respect to files stored remotely to data infrastructure service 420.

Malware corruption detection 457 is configured to receive a recently modified file to be used in a vector comparison. The recently modified file is stored in storage 443 but may be stored in a number of local or remote locations. File 441 is generally representative of a recently modified file. Upon receiving file 441, malware corruption detection 457 performs a vector comparison. Where the vector variation exceeds a threshold criteria, a mitigation request is submitted to malware mitigation 459.

Malware scanner 458 is configured to scan all of the files in storage 443, including file 441. Malware scanner 458 scans each of the files of storage 443 in turn, and where evidence of a malware attack is detected, a mitigation request is sent to malware mitigation 459.

Malware corruption detection 457 and malware scanner 458 may operate independently of each other and can execute alternative forms of malware corruption detection in parallel. Notably, there may be a delay in time between the execution of a malware attack and the detection of the malware by malware scanner 458. This is because in using a round robin style of file scanning, malware scanner 458 may not scan the changed file before scanning a number of other files, the scanning of each of which requires time and resources. Malware corruption detection 457 does not experience this delay, as the vector comparison performed by malware corruption detection 457 can be triggered specifically by a change to a file. To evaluate the recency of a change to a file, malware corruption detection 457 may use file metadata.

For example, where a malware attack modifies file 441, malware corruption detection 457 immediately begins a vector comparison on file 441. Malware scanner 458 may not, by this point, have detected any malware attack at all. It is not until the round robin schema used by malware scanner 458 reaches file 441 in the round robin queue that a problem can be detected.

Figure 5:
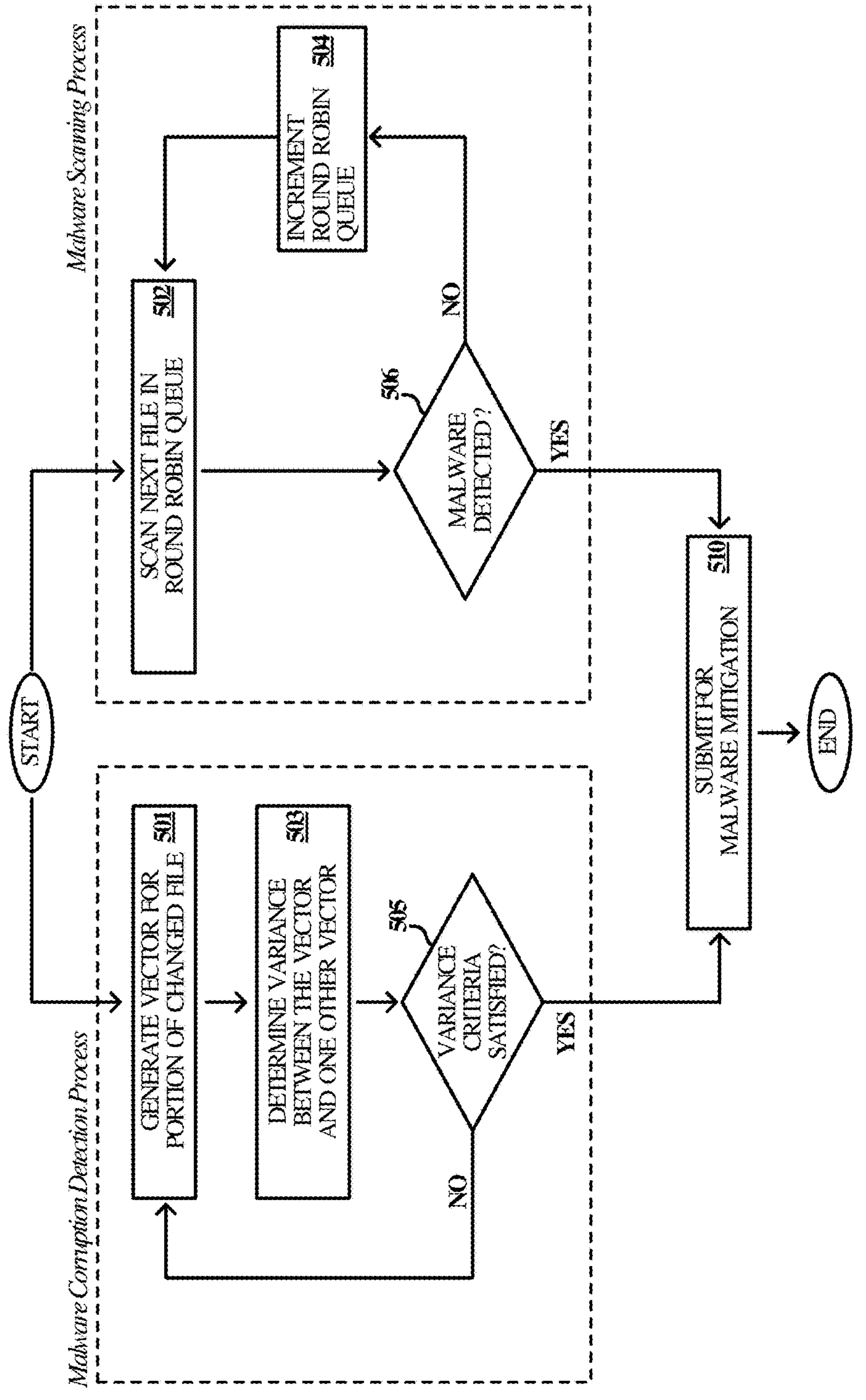
FIG. 5 illustrates a computing system in an implementation.

FIG. 5 illustrates an application of malware assessment process 435 in an implementation. Malware corruption detection process 500 may be implemented in program instructions in the context of the software and/or firmware elements of data infrastructure service 420 of FIG. 4A and FIG. 4B. The program instructions, when executed by one or more processing devices of one or more computing systems (e.g., computing device 605 in FIG. 6), direct the one or more computing systems to operate as follows, referring parenthetically to the steps in FIG. 5, and in the singular to a computing device for the sake of clarity.

To begin, a malware assessment process initiates a malware corruption detection process and a malware scanning process. Referring first to the malware corruption detection process. To initiate the malware corruption detection process, a security engine of a data infrastructure service generates a vector having multiple dimensions for a portion of a file to be used in a vector comparison (step 501). Each dimension of the multiple dimensions of the vector corresponds to a feature of the portion of the file. A variation engine of the data infrastructure service determines a variation between the vector and one other vector based on one other portion of the file (step 503). The variation engine determines if the variation exceeds a threshold criteria (step 505). Where the variation between the vector and one other vector does not exceed a threshold criteria, the security engine of the data infrastructure service repeats the malware corruption detection process. Where the variation between the vector and one other vector does exceed a threshold criteria, the security engine submits a request for malware mitigation to a malware mitigation process (step 510).

Now referring to the malware scanning process. To initiate the malware scanning process, the data infrastructure service scans a file in a round robin queue (step 502). Where malware is detected (step 504), the data infrastructure service submits a request for malware mitigation to a malware mitigation process (step 510). Where malware is not detected (step 506), the data infrastructure service increments a round robin queue (step 506), and repeats the process.

Figure 6:
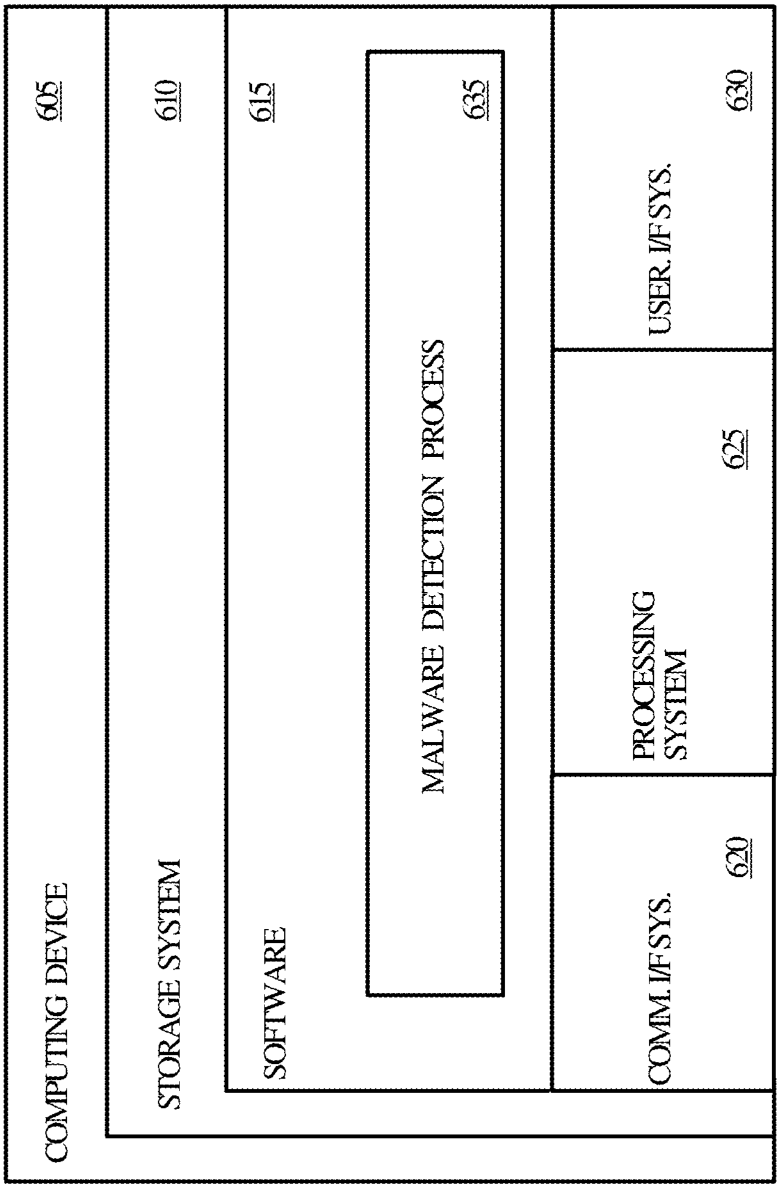
FIG. 6 illustrates another computing system in an implementation.

FIG. 6 illustrates computing device 605, which is representative of any system or collection of systems in which the various applications, processes, services, and scenarios disclosed herein may be implemented. Examples of computing device 605 include, but are not limited to server computers, web servers, cloud computing platforms, and data center equipment, as well as any other type of physical or virtual server machine, container, and any variation or combination thereof. (In some examples, computing device 605 may also be representative of desktop and laptop computers, tablet computers, and the like.)

Computing device 605 may be implemented as a single apparatus, system, or device or may be implemented in a distributed manner as multiple apparatuses, systems, or devices. Computing device 605 includes, but is not limited to, processing system 625, storage system 610, software 615, communication interface system 620, and user interface system 630. Processing system 625 is operatively coupled with storage system 610, communication interface system 620, and user interface system 630.

Processing system 625 loads and executes software 615 from storage system 610. Software 615 includes and implements malware corruption detection process 635, which is representative of the processes discussed with respect to the preceding Figures, such as malware corruption detection process 200. When executed by processing system 625, software 615 directs processing system 625 to operate as described herein for at least the various processes, operational scenarios, and sequences discussed in the foregoing implementations. Computing device 605 may optionally include additional devices, features, or functionality not discussed for purposes of brevity.

Referring still to FIG. 6, processing system 625 may include a micro-processor and other circuitry that retrieves and executes software 615 from storage system 610. Processing system 625 may be implemented within a single processing device but may also be distributed across multiple processing devices or sub-systems that cooperate in executing program instructions. Examples of processing system 625 include general purpose central processing units, microcontroller units, graphical processing units, application specific processors, integrated circuits, application specific integrated circuits, and logic devices, as well as any other type of processing device, combinations, or variations thereof.

Storage system 610 may comprise any computer readable storage media readable by processing system 625 and capable of storing software 615. Storage system 610 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 610 may be implemented as a single storage device but may also be implemented across multiple storage devices or sub-systems co-located or distributed relative to each other. Storage system 610 may comprise additional elements, such as a controller, capable of communicating with processing system 625 or possibly other systems.

Software 615 (including malware corruption detection process 635) may be implemented in program instructions and among other functions may, when executed by processing system 625, direct processing system 625 to operate as described with respect to the various operational scenarios, sequences, and processes illustrated herein. For example, software 615 may include program instructions for implementing malware corruption detection processes and procedures as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 615 may include additional processes, programs, or components, such as operating system software, virtualization software, or other application software. Software 615 may also comprise firmware or some other form of machine-readable processing instructions executable by processing system 625.

In general, software 615, when loaded into processing system 625 and executed, transforms a suitable apparatus, system, or device (of which computing device 605 is representative) overall from a general-purpose computing system into a special-purpose computing system customized to support malware corruption detection as described herein. Indeed, encoding software 615 on storage system 610 may transform the physical structure of storage system 610. The specific transformation of the physical structure may depend on various factors in different implementations of this description. Examples of such factors may include, but are not limited to, the technology used to implement the storage media of storage system 610 and whether the computer-storage media are characterized as primary or secondary storage, as well as other factors.

For example, if the computer readable storage media are implemented as semiconductor-based memory, software 615 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 620 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 605 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of detecting malware, the method comprising:

by one or more computing devices:

identifying a first portion of a file to be used in a vector comparison, wherein the file comprises an electronic document, and wherein the first portion of the file comprises one or more paragraphs in the electronic document;

generating, for the first portion of the file, a first vector having multiple dimensions by supplying the first portion of the file as input to multiple feature engines;

identifying a second portion of the file to be used in the vector comparison, wherein the second portion of the file comprises one or more different paragraphs in a same instance of the electronic document;

generating, for the second portion of the file, a second vector having multiple dimensions by supplying the second portion of the file as input to the multiple feature engines;

determining a magnitude of variation between the first vector and the second vector by comparing the first vector and the second vector to each other; and performing, in response to determining that the magnitude of variation exceeds the threshold amount, at least one actions with respect to the file.

2. The method of claim 1, wherein:

the action comprises malware mitigation; and the method further comprises performing the malware mitigation with respect to the file.

3. The method of claim 1, wherein:

the action comprises editing assistance;

the method further comprises performing the editing assistance with respect to the file; and performing the editing assistance with respect to the file comprises checking the file for editing errors.

4. The method of claim 1, wherein:

the first portion of the file comprises a text string of the one or more paragraphs in the electronic document; and the multiple dimensions of the first vector comprise one or more features of the text string.

5. The method of claim 4, wherein:

the one or more features of the text string comprise one or more of each of a semantic feature, a linguistic feature, or a combination thereof.

6. The method of claim 1, wherein each of the multiple feature engines generates a corresponding one of the multiple dimensions of the first vector, and wherein each dimension of the multiple dimensions of the first vector corresponds to a different feature of the first portion of the file.

7. The method of claim 1, wherein each dimension of the multiple dimensions of the second vector corresponds to a different feature of the second portion of the file.

8. A computing apparatus comprising:

one or more computer readable storage media;

one or more processors operatively coupled with the one or more computer readable storage media; and program instructions stored on the one or more computer readable storage media, wherein the program instructions, when executed by the one or more processors, direct the computing apparatus to at least:

identify a first portion of a file to be used in a vector comparison, wherein the file comprises an electronic document, and wherein the first portion of the file comprises one or more paragraphs in the electronic document;

generate, for the first portion of the file, a first vector having multiple dimensions by supplying the first portion of the file as input to multiple feature engines;

identify a second portion of the file to be used in the vector comparison, wherein the second portion of the file comprises one or more different paragraphs in a same instance of the electronic document;

generate, for the second portion of the file, a second vector having multiple dimensions by supplying the second portion of the file as input to the multiple features engines;

determine a magnitude of variation between the first vector and the second vector by comparing the first vector and the second vector to each other;

determine that the magnitude of variation exceeds a threshold amount by comparing the magnitude of variation to the threshold amount; and in response to determining that the magnitude of variation exceeds the threshold amount, determine to perform at least an action with respect to the file.

9. The computing apparatus of claim 8, wherein:

the action comprises malware mitigation; and the program instructions further comprise instructions that, when executed, direct the computing apparatus to perform the malware mitigation with respect to the file.

10. The computing apparatus of claim 8, wherein:

the action comprises editing assistance;

the program instructions further comprise instructions that, when executed, direct the computing apparatus to perform the editing assistance with respect to the file; and to perform the editing assistance with respect to the file, the program instructions direct the computing apparatus to check the file for editing errors.

11. The computing apparatus of claim 8, wherein:

the first portion of the file comprises a text string of the one or more paragraphs in the electronic document; and the multiple dimensions of the first vector comprise one or more features of the text string.

12. The computing apparatus of claim 11, wherein:

the one or more features of the text string comprise one or more of each of a semantic feature, a linguistic feature, or a combination thereof.

13. The computing apparatus of claim 8, wherein each of the multiple feature engines are configured to generate a corresponding one of the multiple dimensions of the first vector, and wherein each dimension of the multiple dimensions of the first vector corresponds to a different feature of the first portion of the file.

14. The computing apparatus of claim 8, wherein each dimension of the multiple dimensions of the second vector corresponds to a different feature of the second portion of the file.

15. A computer implemented system for detecting an anomaly, the system comprising:

a security engine configured to:

identify a first portion of a file to be used in a vector comparison, wherein the file comprises an electronic document, and wherein the first portion of the file comprises one or more paragraphs in the electronic document, generate, for the first portion of the file, a first vector having multiple dimensions by supplying the first portion of the file as input to multiple feature engines, identify a second portion of the file to be used in the vector comparison, wherein the second portion of the file comprises on or more different paragraphs in a same instance of the electronic document, generate, for the second portion of the file, a second vector having multiple dimensions by supplying the second portion of the file as input to the multiple features engines; and a variation engine configured to:

determine a magnitude of variation between the first vector and the second by comparing the first vector and the second vector to each other, determine that the magnitude of variation exceeds a threshold amount by comparing the magnitude of variation to the threshold amount in response to a determination that the magnitude of variation exceeds the threshold amount, determine to perform at least an action with respect to the file.

16. The system of claim 15, wherein:

the action comprises malware mitigation; and the variation engine is further configured to perform the malware mitigation with respect to the file.

17. The system of claim 15, wherein:

the action comprises editing assistance;

the variation engine is further configured to perform the editing assistance with respect to the file; and to perform the editing assistance with respect to the file, the variation engine is configured to check the file for editing errors.

18. The system of claim 15, wherein:

the first portion of the file comprises a text string of the one or more paragraphs in the electronic document;

the multiple dimensions of the first vector comprise one or more features of the text string.

19. The system of claim 18, wherein:

the features of the text string comprise one or more of each of a semantic feature, a linguistic feature, or a combination thereof.

20. The system of claim 15, wherein each of the multiple feature engines are configured to generate a corresponding one of the multiple dimensions of the first vector, and wherein each dimension of the multiple dimensions of the first vector corresponds to a different feature of the first portion of the file.

* * * * *